No. 655,630. Patented Aug. 7, 1900.
E. F. LAFAYETTE.
GUIDE AND SUPPORT FOR DRAG SAWS.
(Application filed May 19, 1900.)
(No Model.)
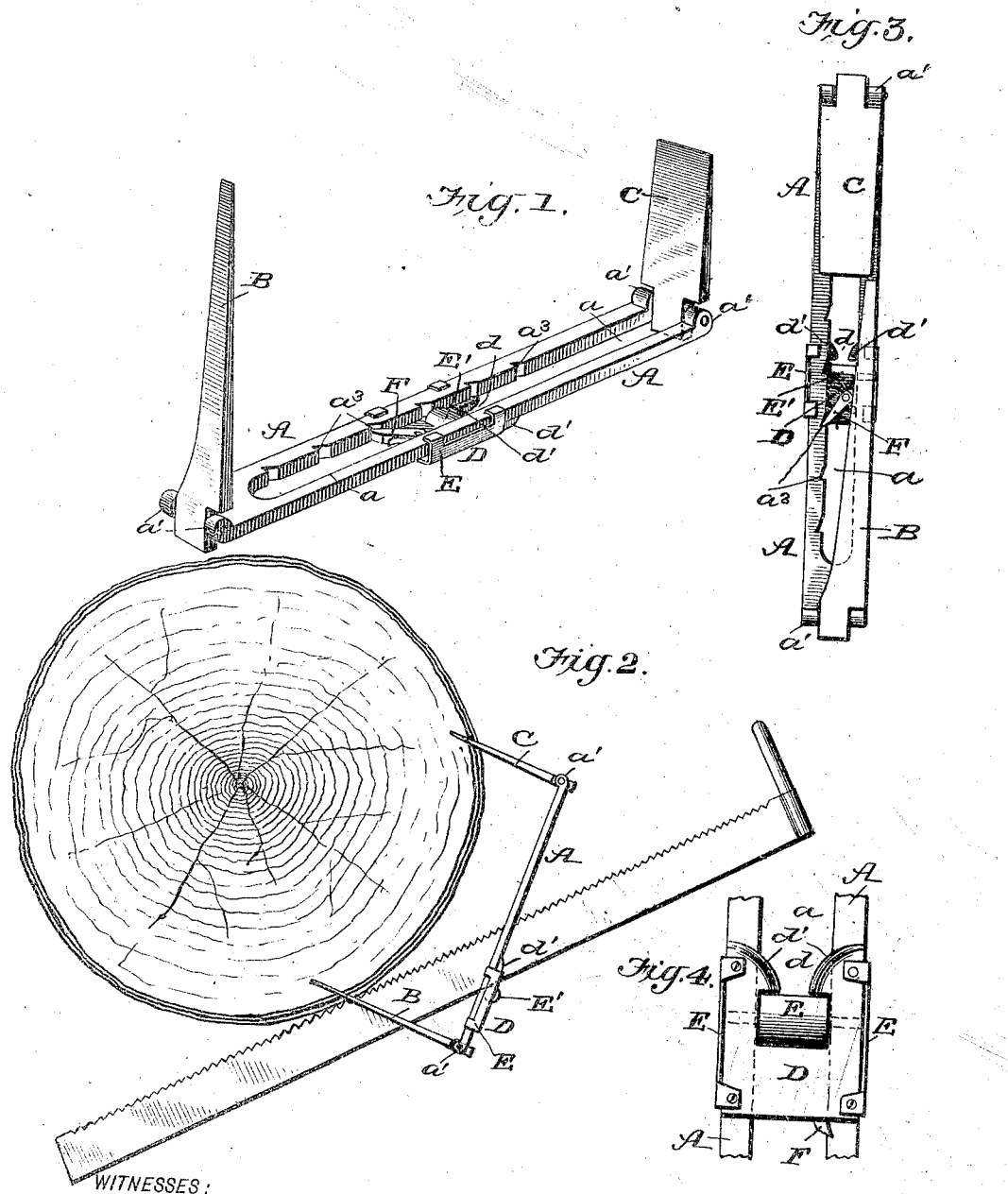
WITNESSES:
Jos. A. Ryan
Amos W. Hart
INVENTOR
Edgar F. Lafayette
BY Munn & Co.
ATTORNEYS

UNITED STATES PATENT OFFICE.

EDGAR FRANCIS LAFAYETTE, OF SEDRO, WASHINGTON.

GUIDE AND SUPPORT FOR DRAG-SAWS.

SPECIFICATION forming part of Letters Patent No. 655,630, dated August 7, 1900.

Application filed May 19, 1900. Serial No. 17,277. (No model.)

*To all whom it may concern:*

Be it known that I, EDGAR FRANCIS LAFAYETTE, of Sedro, in the county of Skagit and State of Washington, have made a new and useful Improvement in Guides and Supports for Drag-Saws, of which the following is a specification.

My invention is a device or small apparatus adapted for attachment to logs or felled trees for guiding and supporting a drag-saw while undercutting them.

In its preferable form the invention is embodied in a short slotted bar having spikes or wedges hinged to its ends and a plate or other device adapted for adjustment along the bar and having a roller upon which a saw may be supported while being reciprocated. In practice the wedges are driven into a log or fallen tree, and thus support the slotted bar, which in turn supports and guides the saw, as hereinafter described.

In the drawings, Figure 1 is a perspective view of my invention. Fig. 2 is a view illustrating the practical use of the apparatus. Fig. 3 is a plan view of the apparatus, showing the hinged wedges folded. Fig. 4 is a face view of a portion of the apparatus.

The narrow and flat bar A, which in practice is made about eighteen inches in length, has a longitudinal slot $a$, extending from one end nearly to the other. A long wedge B is hinged to the solid end of the bar and a shorter wedge C to the other end. The wedge C is broad and may be of uniform width, while the longer one B is essentially triangular, as seen in plain view, one side being cut away or inclined to allow space for the saw to work past it, as shown in Fig. 1. The butts of the wedges project beyond the parts $a'$, so that a hammer or mallet may be conveniently used on them for driving the wedges. The ends $a'$ of the bar A are curved or project to one side a distance equal to about the thickness of the butts of the wedges B C, so that the latter may be folded flat upon, and thus lie parallel to the bar A, as shown in Fig. 3, for the purpose of economizing space, and thus facilitating transportation or storage of the apparatus in small space.

The adjustable saw-support proper, D, is a flat plate adapted to lie on the bar A, and secured thereto so as to slide easily by means of side clips and guides E. The latter may be constructed in any suitable manner, so as to embrace and slide upon the bar A. The plate D has a notch or open slot $d$ at its upper end, and a roller E is journaled in a central space just below the said notch. The end portions $d'$ of the plate D project inward over the roller E (see Fig. 4) and are rounded or beveled outward to facilitate entrance of the saw into the slot or notch $d$. A spring-pawl F is pivoted to the back side of the plate D and engages notches $a^3$, (see Figs. 1 and 3,) formed in the adjacent inner side of the bar A.

The manner of applying and using the apparatus, as shown in Fig. 2, consists in driving the wedges B C into a log or trunk of a felled tree a sufficient distance to enable them to hold securely by friction, and thus support the bar A rigidly in the required position adjacent to the log and at right angles to its axis. A saw is passed through the slot $a$ in bar A, and its back rests on the roller E, upon which it rides when reciprocated, while the slot $d$ of plate D affords a lateral guide for the same, as will be readily understood. The plate D is adjusted higher or lower on the bar A, as conditions require, and is supported at any desired height by means of the pawl F, as before described. The longer wedge being inclined or beveled on one side is out of the way of the saw.

In its broader aspect the bar may have any form of devices adapted for attachment to or insertion in a log or tree-trunk for holding the bar in due position while the saw is in use. In another aspect I do not restrict myself to wedges such as described and shown, but propose to employ any form of device that may be attached to a log, whether hinged and foldable or not.

Having thus described my invention, what I claim, and desire to secure by Letters Patent, is—

1. The improved saw guide and support, comprising a bar, a pointed device hinged to each end and adapted to fold flat, or to be driven into a log when turned out, and a support for a saw which is attached to the bar intermediate of said pointed devices, whereby the apparatus is adapted for application and use on the under side of a log as shown and described.

2. An improved saw guide and support, comprising a bar having wedges or pointed devices hinged to its ends, and a saw-guiding device which is movable on said bar, and means for securing such device in any adjustment, substantially as shown and described.

3. An improved saw guide and support comprising a bar having a longitudinal slot, wedges hinged to its ends, a plate having a notch or slot to receive a saw, and adapted to slide on the bar, and means for securing it in any adjustment, substantially as shown and described.

4. An improved saw guide and support comprising a slotted bar, wedges attached to its ends, and a slidable device, a roller carried by the latter, a pawl for holding said device at any desired height, as shown and described.

5. An improved saw guide and support comprising a bar having wedges hinged to its ends and adapted to fold, substantially as shown and described.

6. An improved saw-guide comprising a bar having its ends projected inward or to one side, and wedges hinged to such projections as shown and described, whereby they are adapted to fold and lie flat upon the body of the bar as shown and described.

7. An improved saw guide and support comprising a bar having wedges attached to its ends, one of which is inclined to one side, so as to be out of the path of the saw when the latter is in use, as shown and described.

8. An improved saw guide and support comprising a bar, wedges hinged to it and adapted to fold as specified, and having ends that project beyond the bar when said wedges are turned out in position for driving, substantially as shown and described.

EDGAR FRANCIS LAFAYETTE.

Witnesses:
J. B. HOLBROOK,
C. E. BINGHAM.